United States Patent
Chheda et al.

(10) Patent No.: US 7,246,222 B2
(45) Date of Patent: *Jul. 17, 2007

(54) PROCESSOR TYPE DETERMINATION BASED ON RESET VECTOR CHARACTERISTICS

(75) Inventors: Sachin N. Chheda, Roseville, CA (US); Dale J. Shidla, Roseville, CA (US); Jacky Tsun-Yao Chang, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

This patent is subject to a terminal disclaimer.

(21) Appl. No.: 10/420,287

(22) Filed: Apr. 21, 2003

(65) Prior Publication Data

US 2004/0210750 A1   Oct. 21, 2004

(51) Int. Cl.
*G06F 15/177* (2006.01)

(52) U.S. Cl. .............................................. 713/1; 712/1
(58) Field of Classification Search .................... None
See application file for complete search history.

(56) References Cited

U.S. PATENT DOCUMENTS

| | | | |
|---|---|---|---|
| 5,724,527 A | 3/1998 | Karnik et al. | |
| 6,353,894 B1* | 3/2002 | Pione | 713/340 |
| 6,381,693 B2* | 4/2002 | Fish et al. | 713/1 |
| 6,704,865 B1 | 3/2004 | Duff | |
| 6,834,384 B2* | 12/2004 | Fiorella et al. | 717/169 |
| 2003/0233536 A1* | 12/2003 | Chheda et al. | 713/1 |

FOREIGN PATENT DOCUMENTS

JP   6-175829   6/1994

* cited by examiner

*Primary Examiner*—James K. Trujillo
*Assistant Examiner*—Anand B. Patel (57) ABSTRACT

A system and method of processor type determination. A reset vector from a processor is identified. Responsive to characteristics of the reset vector, a processor type of the processor is determined.

21 Claims, 4 Drawing Sheets

PROCESSOR TYPE DETERMINATION BASED ON RESET VECTOR CHARACTERISTICS

TECHNICAL FIELD

Embodiments of the present invention relate to the design, manufacture and operation of computer systems.

BACKGROUND ART

The computer industry is continually creating new types of processors and new generations within families of processors to meet an appetite among computer users for increased speed, additional features, and other improvements. Manufacturers of computer systems are constantly challenged to provide new computer systems that take full advantage of such new processors.

Unfortunately, each different type of processors typically requires a corresponding and different type of software because of the differences in the processor architectures from processor to processor. For example, a first type of processor cannot typically operate with or execute software designed for a second type of processor. One specific type of software common to most computer systems is firmware, or initialization software. Firmware typically controls the processor, and often other peripherals, from the point that a processor is "turned on" or starts execution until higher level software, e.g., an operating system, is loaded and assumes control. Firmware may also provide certain baseline functionality or "system calls" utilized by an operating system to minimize the operating system's dependence upon particular system hardware features. Firmware is typically stored in read only memory, e.g., read only memory (ROM) or electrically erasable programmable memory, devices. Sometimes only a first portion of firmware is stored in such devices and subsequent portions are read into random access memory (RAM) from other storage devices, e.g., magnetic media.

For successful system initialization, the firmware should have an awareness of certain aspects of a system's configuration, for example, a system's memory map. Consequently, the system manufacturer typically provides the firmware in a system. Conventionally, system manufacturers match a processor or processor type with a corresponding firmware during system assembly. For reasons of design and production efficiency, a computer system manufacturer will typically design such systems to support different types of processors with as much commonality in design and production process as possible.

After manufacture, it may be desirable to change processor types in a computer system. For example, a manufacturer may have not predicted demand for systems with a first type of processor, instead producing systems with a second type of processor. In such a case, it may be desirable to convert existing system inventory from systems with processors of the second type to systems with processors of the first type. Additionally, it may become desirable for a customer to change processors or types of processors.

Unfortunately, changing processors and/or processor types typically also requires changing firmware to correspond to the new processor. Since the firmware is typically separate from a processor, e.g., in a ROM chip, changing a system's firmware requires additional effort in addition to replacing the system's processor. For example, in some cases ROM chips may be replaced. Alternatively, an entire system board containing the firmware may be replaced. It is to be appreciated that such replacement can be difficult, time consuming, expensive and error prone, particularly when upgrading multiple computers.

A method and/or system that facilitates changing processors while addressing the aforementioned problems would be of value.

SUMMARY OF THE INVENTION

A system and method of processor type determination are disclosed. A reset vector from a processor is identified. Responsive to characteristics of the reset vector, a processor type of the processor is determined.

BEST MODES FOR CARRYING OUT THE INVENTION

Co-pending, commonly owned United States patent application "Automatic Selection of Firmware for a Computer that Allows a Plurality of Processor Types," Ser. No. 10/171,873, filed Jun. 13, 2002, to Chheda and Choksey, is hereby incorporated by reference herein in its entirety.

Figure 1:
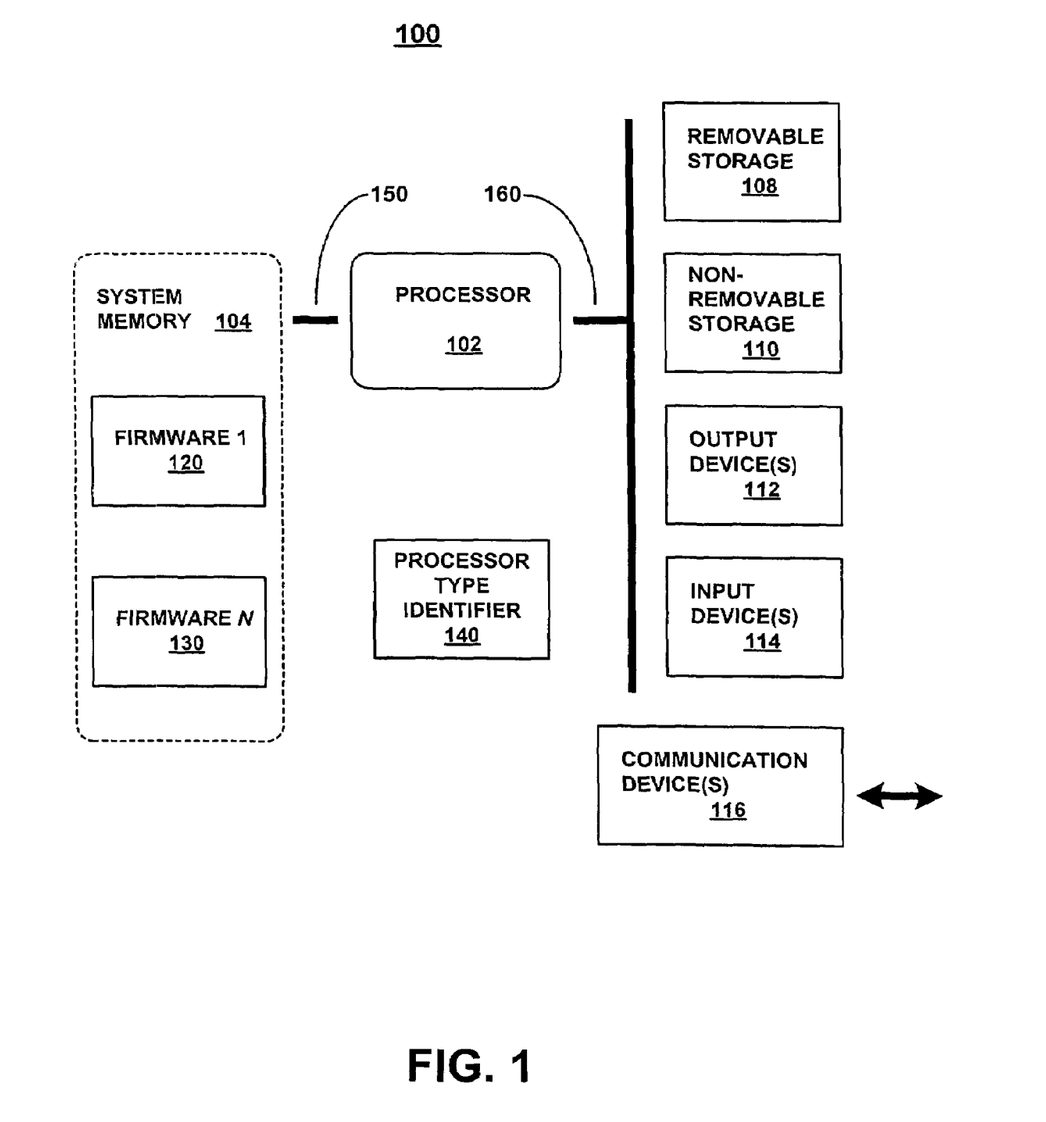
FIG. 1 illustrates a block diagram of computer system, according to an embodiment of the present invention.

FIG. 1 illustrates a block diagram of computer system 100, which allows one to change a processor without replacing or reprogramming firmware, according to an embodiment of the present invention. More specifically, a first processor corresponding to a first firmware can be replaced with a second processor corresponding to a second firmware, the second firmware being different from the first firmware, without replacing or reprogramming firmware.

Exemplary embodiments of computer system 100 include, but are not limited to, a server, general purpose personal computers (PCs), hand-held or lap top computers, multiprocessor systems, microprocessor-based systems, programmable consumer electronics, network computers, mobile or "cellular" telephony devices, Personal Communication Systems (PCS), electronic game systems, Personal Digital Assistants (PDA), minicomputers, mainframe computers, and distributed computing environments that include any one or more of the above computing systems or devices. Computer system 100 typically includes at least one processor 102 and system memory 104. Processor 102 can be any one of many commercially available processors available in the industry.

Computer system 100 may further comprise additional features and functionality. For example, computer system 100 may also include removable storage 108 and non-removable storage 110. Computer storage media includes volatile and non-volatile, removable and non-removable media implemented in any method or technology for storage of information such as computer readable instructions, data structures, program modules or other data. Computer storage media include, but are not limited to, RAM, ROM, EEPROM, flash memory or other memory technology, compact disc read only memory (CD-ROM), digital versatile disks (DVD) or other optical storage, magnetic cassettes, magnetic tape, magnetic disk storage or other magnetic storage devices, or any other medium which can be used to store the desired information and which can be accessed by computer system 100. Any such computer storage media may be part of computer system 100.

Computer 100 may also include communications device (s) 116 that allow the computer to communicate with other computers/devices. Computer system 100 may also have input device(s) 114 such as a keyboard, mouse, pen, voice input device, touch input device, etc. Output device(s) 112 such as a display, speakers, printer, etc., may also be included.

Processor 102 is functionally coupled to system memory via bus 150, and to peripheral devices 108-116 via bus 160. Embodiments of the present invention are well suited to arrangements wherein buses 150 and 160 are the same bus structure, as well as arrangements in which buses 150 and 160 are not the same. Buses 150, 160 typically include address lines, e.g., 64 address lines, and data lines, e.g., 16 or 32 lines, and various control signals to indicate the direction of a data operation, e.g., "read" or "write," and the validity of data and address signals and other control signals, including a reset signal.

System memory 104 includes a plurality of computer readable media comprising firmware 1 120 through firmware N 130. In many computer systems, firmware is stored in integrated circuit memory devices, e.g., ROM, EEPROM or flash memory chips. Firmware 1 120 through firmware N 130 correspond to a plurality of processors or processor types supported by system 100 that utilize correspondingly unique firmware. For example, system 100 is designed to support N types of processors requiring unique firmware. It is to be appreciated that differences between processors may require unique firmware even for processors that execute a compatible instruction set. For example, two processors that execute a compatible instruction set may require differing initialization values and/or a different sequence of startup instructions for proper operation. Embodiments of the present invention are well suited to such different processors.

Firmware 1 130 through firmware N 130 may be contained in well known types of non-volatile memory devices, such as a mask ROM, EPROM, flash EEPROM and the like. It is to be appreciated that firmware 1 120 through firmware N 130 may reside in one or multiple memory devices.

As will be described in greater detail below, processor type identifier 140 identifies the type of processor installed in system 100. With information of processor type, processor type identifier 140 and/or other system logic can determine the appropriate firmware, e.g., firmware 1 130 or firmware N 130, for processor 102 to execute.

Figure 2:
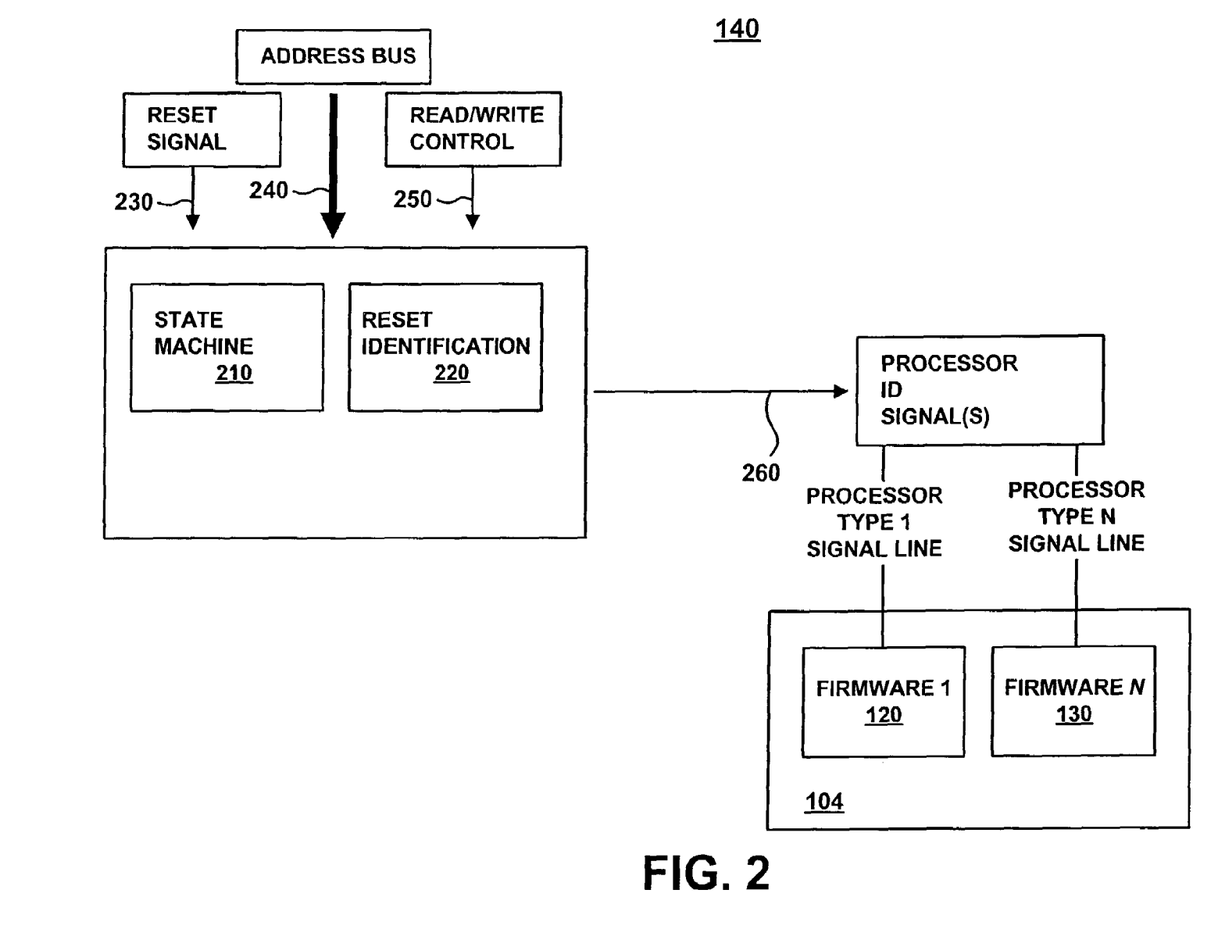
FIG. 2 illustrates a processor type identifier, according to an embodiment of the present invention.

FIG. 2 illustrates a processor type identifier 140, according to an embodiment of the present invention. Processor type identifier 140 takes as input a reset signal 230, read/write control signals 250 and address bus 240. Typically, these signals are part of bus 150 of FIG. 1. Reset signal 230 can be any well known reset signal type, including a system power on reset, a software controlled reset signal, e.g., an output of processor 102, or the like. Read/write control signals 250 can be any well known type of control signals for determining if a memory access is a read or a write operation. Embodiments of the present invention are well suited to both "Intel" style and "Motorola" style of memory control signals. In addition, embodiments of the present invention are well suited to Harvard type architectures for processor 102, in which case read write control signals 250 may further comprise a signal to differentiate between instruction and data spaces.

When processor 102 (FIG. 1) is reset, the processor begins a sequence of events. One of the first externally visible events performed by processor 102 after reset is to output a "reset vector." A reset vector is typically a fetch or data request to a specific first memory address. Usually the contents of the memory at that first address comprise a second memory address. The memory at the second memory address contains the first (external) instruction of the firmware to be executed by the processor after reset. Sometimes the contents of the memory at that first address comprise the first external instruction of the firmware to be executed by the processor after reset.

Referring to FIG. 2 once again, state machine 210 detects a reset vector from processor 102 by inspecting reset signal 230 and read/write control signals 250. For example, a reset vector may be identified by the first read signal following the de-assertion of reset signal 230. It is appreciated that state machine 210 may detect a reset vector by a wide variety of combinations of signals corresponding to various types of processor 102 and other system implementation details, according to embodiments of the present invention.

Typically, different processors and processor types will output corresponding unique reset vectors. For example, a first processor may output a reset vector of "00000000," while a second processor may output a reset vector of "00001111." It is appreciated that typical modern processors output a larger address, e.g., 64 bits, as a reset vector. Embodiments of the present invention are well suited to various address widths.

Reset identification 220 uses knowledge of reset vector differences among a plurality of processors to produce processor identification (ID) signals 260. Processor identification signals 260 may, for example, comprise a dedicated signal line for each supported processor type. Each signal line corresponding to a processor type may then be used as a chip select signal to select from among firmware 1 120 through firmware N 130. It is to be appreciated that other encodings of processor type in processor identification signal(s) 260 are well suited to embodiments of the present invention. For example, two signal lines can be used to represent up to four processor types. Alternatively, processor identification signal line(s) 260 could implement serial communications to communicate a large numbers of processor types on a limited number of signal lines.

An exemplary method of representing such reset vector differences among a plurality of processors is illustrated in Table 1, below. Table 1 illustrates an exemplary Reset Vector Identification Table, according to an embodiment of the present invention.

TABLE 1

Exemplary Reset Vector Identification Table

| Reset Vector Value | Processor Type |
|---|---|
| 00000000 | 0 |
| 00000100 | 1 |
| . | . |
| . | . |
| . | . |
| 00001111 | N |

According to an embodiment of the present invention, responsive to identification of a reset vector output from processor 102, state machine 210 performs a lookup from Table 1 indexed by the reset vector value to determine a corresponding processor identification value. For example, if a reset vector output from processor 102 is "00001111," then the value output from processor type identifier 140 is "N."

Table 2 illustrates an exemplary Reset Vector Identification Table, according to an alternative embodiment of the present invention.

TABLE 2

Exemplary Reset Vector Identification Table

| Reset Vector Value | Firmware Index |
|---|---|
| 00000000 | 0 |
| 00000100 | 1 |
| . | . |
| . | . |
| . | . |
| 00001111 | N |

According to an embodiment of the present invention, responsive to identification of a reset vector output from processor 102, state machine 210 performs a lookup from Table 2 indexed by the reset vector value to determine a corresponding firmware index. For example, if a reset vector output from processor 102 is "00001111," then the firmware index is "N." A firmware index value can be used to identify an appropriate firmware set corresponding to processor 102 (FIG. 1).

Alternatively, a firmware index value can be used as an index into a table, e.g., Table 3 below, to lookup a firmware location, e.g., a starting address, in memory, according to an embodiment of the present invention. Table 3 is an exemplary Firmware Location Lookup Table.

TABLE 3

Firmware Location Lookup Table

| Firmware Index | Firmware Start Address |
|---|---|
| 0 | 00000000h |
| 1 | 0001FF00h |
| . | . |
| . | . |
| . | . |
| N | N-th address |

Responsive to identification of a reset vector output from processor 102, state machine 210 performs a lookup from Table 3 indexed by the firmware index (which can be determined from a reset vector value) to determine a corresponding firmware start address. For example, if a firmware index is 1, then the corresponding firmware start address is "0001FF00h." The "h" notation indicates that the number is represented in the hexadecimal or base-16 number system.

Table 4, below, illustrates an exemplary Reset Vector Identification Table, according to an alternative embodiment of the present invention.

TABLE 4

Exemplary Reset Vector Identification Table

| Reset Vector Value | Firmware Start Address |
|---|---|
| 00000000 | 00000000h |
| 00000100 | 0001FF00h |

TABLE 4-continued

Exemplary Reset Vector Identification Table

| Reset Vector Value | Firmware Start Address |
|---|---|
| . | . |
| . | . |
| . | . |
| 00001111 | N-th address |

According to an embodiment of the present invention, responsive to identification of a reset vector output from processor 102, state machine 210 performs a lookup from Table 4 indexed by the reset vector value to determine a corresponding firmware start address. For example, if a reset vector output from processor 102 is "00001111," then the value output from processor type identifier 140 is the "N-th" address.

It is to be appreciated that embodiments of the present invention are well suited to other implementations of reset identification block 220. For example, combinatorial logic may convert a reset vector into a processor identification encoding or firmware start address.

A Reset Vector Identification Table is typically stored in non-volatile memory. However, it can be stored in a variety of media. For example, a Reset Vector Identification Table can be a part of system chip set. Alternatively, a Reset Vector Identification Table could be stored at a known address in system memory 104 (FIG. 1), similarly to firmware 1 120 through firmware N 130. For example, responsive to identification of a reset vector output from processor 102, state machine 210 performs a memory access to a Reset Vector Identification Table stored in system memory. A processor type code is then used to select the proper firmware for use by processor 102.

A reset vector identification table (or other types of tables described previously) can advantageously be updated to include new processor types and/or new firmware sets by the straight-forward addition of information, e.g., a row in Table 1, to a table providing a correspondence between reset vector information and firmware set.

An indication of processor type, e.g., output on processor identification signals 260, can be used for other purposes in addition to selecting firmware. For example, various processor types may optimally utilize different voltage levels. An indication of processor type can be used to select a voltage level corresponding to a specific processor type. Alternatively, various processor types may optimally utilize different bus timing. An indication of processor type can be used to select optimal bus timing corresponding to a specific processor type. In addition, it may be desirable to automatically determine and report processor types among a computing environment comprising a plurality of computer systems. Embodiments of the present invention are well suited to these and other uses of processor type identification information.

Figure 3:
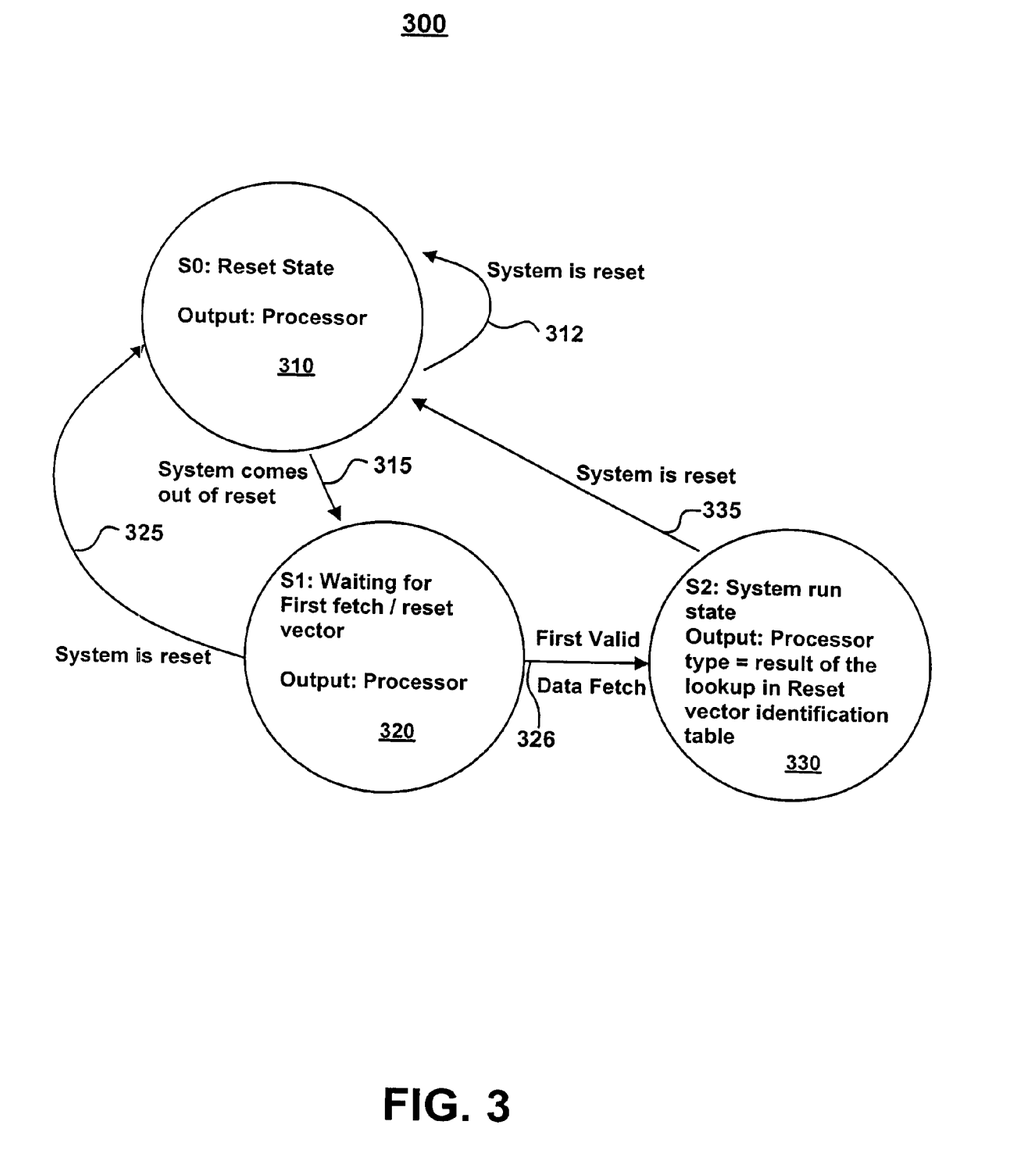
FIG. 3 illustrates a state diagram implemented by a state machine, according to an embodiment of the present invention.

FIG. 3 illustrates a state diagram 300 implemented by state machine 210, according to an embodiment of the present invention.

State S0 310 is the reset state of state machine 210. This state is entered upon power up of state machine 210. Further, this state is entered if the state machine erroneously enters an undefined state. As indicated by state transition 312, it is also reentered when the system is reset, for example when reset signal 230 of FIG. 2 is made active. Processor identification signal(s) 260 should remain unchanged in state 310. For example, they maintain a previous value, or in some cases an initial value.

Referring once again to FIG. 3, state S1 320 is entered by state transition 315 when a system, e.g., system 100 (FIG. 1), comes out of reset. For example, a system is typically "out of reset" when a previously active reset signal, e.g., reset signal 230, becomes inactive. While in state S1 320, the state machine waits for a first data access from a processor, e.g., processor 102 (FIG. 1). It is to be appreciated that various processors implement reset vectors and memory accesses in a variety of fashions. For example, for some types of processors, a reset vector access may be treated as a data access. For other types of processors, a reset vector access may be treated as an instruction fetch. Such differences may result in a variety of indications, e.g., combinations of read/write control signals 250 (FIG. 2), of a reset vector. Embodiments of the present invention are well suited to such various indications of a reset vector. Processor identification signal(s) 260 (FIG. 2) should remain unchanged in state 310. For example, they maintain a previous value from state S0 310.

Referring once again to FIG. 3, there are two exits from state S1 320. In response to a system reset, state transition 325 returns to state S0 310. If a reset vector is recognized by state S1 320, state transition 326 transfers to state S2 330.

State S2 330 is the system run state. For example, for the majority of time during which a system, e.g., computer system 100 (FIG. 1), is operating, state machine 300 is in state S2 330. State S2 330 is entered from state S2 320 upon recognition of a reset vector. State S2 330 utilizes the reset vector, e.g., the address output by a processor, to determine the processor type from among a plurality of processor types. For example, state S2 330 may perform a table lookup from a reset vector identification table, e.g., Table 1, to identify the processor type characteristic of the specific reset vector. It is to be appreciated that state S2 330 may utilize other methods to determine the processor type corresponding to a reset vector from among a plurality of processor types, in accordance with embodiments of the present invention. For example, state S2 330 may utilize combinatorial logic to convert a reset vector into a processor identification encoding.

State S2 330 of FIG. 3 outputs processor identification signal(s) 260 (FIG. 2) corresponding to the processor type identified. State S2 330 should be the only state to modify a value of processor identification signal(s) 260. State transition 335 is the only exit from state S2 330. State transition 335 changes state to state S2 310 in response to a system reset, e.g., an active level on reset signal 230.

State machine 300 of FIG. 3 is well suited to a variety of well known implementations of state machines. For example, state machine 300 can be implemented in sequential logic, e.g., logic gates and latches of an integrated circuit. State machine 300 can also be implemented via software instructions in a processor, in accordance with embodiments of the present invention.

Figure 4:
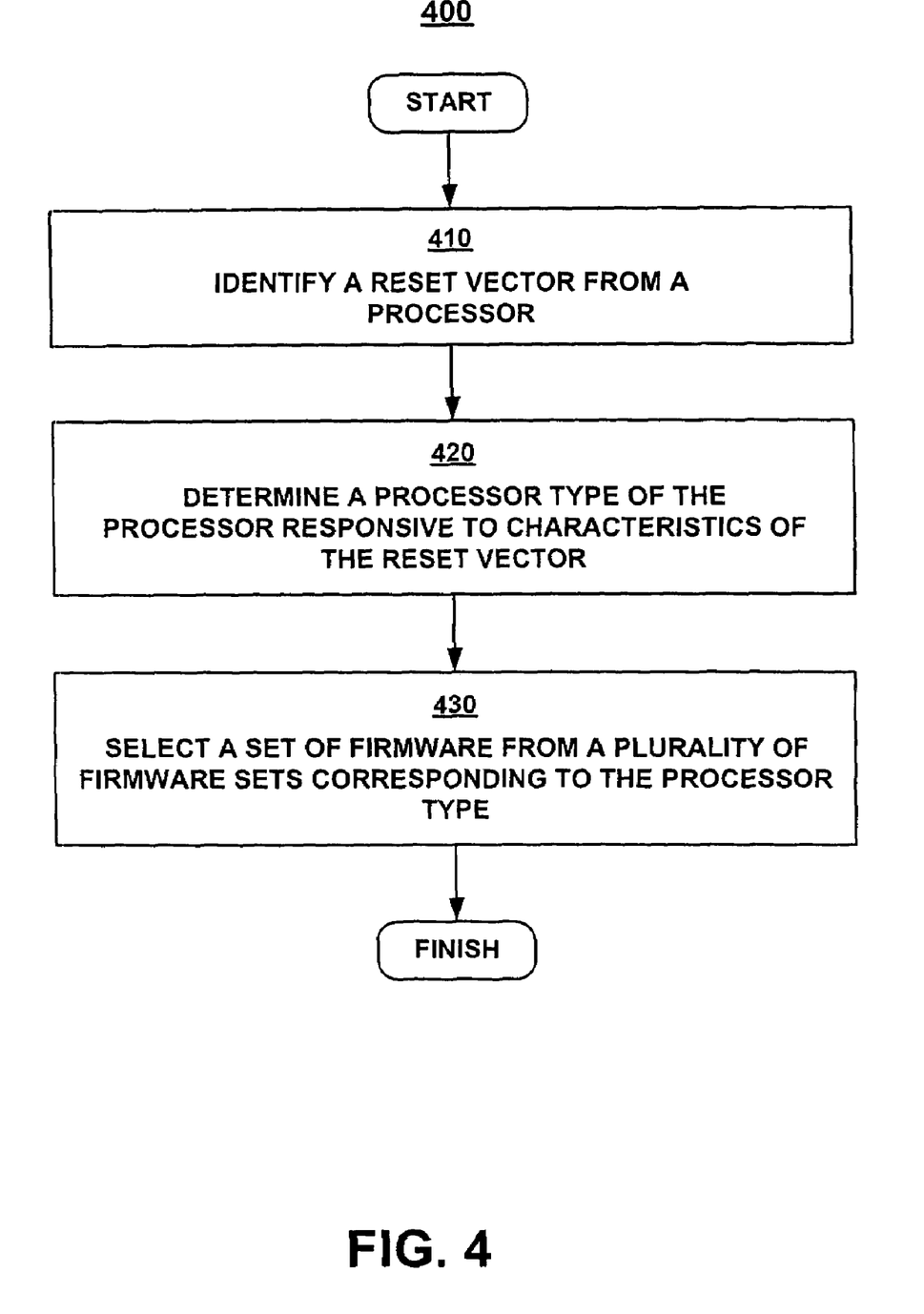
FIG. 4 is a flow chart describing a method of determining a processor type, according to an embodiment of the present invention.

FIG. 4 is a flow chart describing a method 400 of determining a processor type, according to an embodiment of the present invention.

In block 410, a reset vector from a processor is identified. A reset vector is typically an external memory access performed by a processor immediately after the processor completes any internal reset actions. The term "reset vector" is sometimes used to refer to the address output immediately after the processor completes any internal reset actions. The memory contents at the address indicated by the reset vector may be an instruction or the address of an instruction. A reset vector may generally be identified as the first memory access after a reset signal is deasserted. Memory accesses are typically indicated by a particular combination of memory control signals. For example, a read signal may be activated to indicate a memory access. In certain computer systems, a read signal may be utilized in conjunction with a signal indicating whether the read operation is a data or program access. Embodiments of the present invention are well suited to a variety of reset vectors as well as methods of identifying a reset vector.

In block 420, characteristics of the reset vector are used to determine a processor type for the processor generating the reset vector. One such characteristic is the address output by the processor as part of the reset vector. For example, different types of processors output different addresses as part of their reset vectors. For example, a first type of processor outputs a first address as part of its reset vector, while a second type of processor outputs a second address as part of its reset vector. The first and second addresses are different.

One exemplary method used to determine a processor type for the processor generating the reset vector is a reset vector identification table. A reset vector identification table, e.g., Table 1, above, may list a correspondence between reset vector addresses and processor types. For example, a reset vector can be used as an index to locate a processor type or firmware starting address corresponding to a processor type having the characteristic reset vector. Embodiments of the present invention are well suited to other methods of determining a processor type for the processor generating the reset vector. For example, combinatorial logic may generate a processor type in response to a reset vector address.

In optional block 430, a set of firmware from a plurality of firmware sets is selected. The firmware set selected corresponds to the processor type. In this novel manner, the correct firmware for execution on the processor is selected.

Embodiments of the present invention enable a manufacturer to change processor types in a computer system in a more straightforward manner than is applicable under the conventional art. A decision as to which type of processor to install in a particular system may be advantageously postponed until the processor is actually installed. By utilizing the present invention, manufacturers may also utilize a common test procedure for systems with varying processor types.

Customers may also benefit from embodiments of the present invention. A customer may change the processor in a system in order to take advantage of an improved processor architecture or desirable new features without the need to change firmware. In other situations, the customer may find it useful to change processors when a manufacturer discontinues support for a particular processor. Alternatively, a customer may purchase a computer system with a low-end processor. As the customer's computing needs grow, the customer may increase the system's capabilities by upgrading the processor.

Additional advantages of embodiments of the present invention may be found in the area of system management. For example, in a diverse information technology system, a system manager can automatically monitor the type of processors loaded in various systems in order to determine computing resources.

Under the conventional art, processor identification typically utilized dedicated pins on processors and/or processor support chip sets, or physical switches (e.g., dual in-line pin, or DIP, switches). Such switches typically were set by users and/or assemblers to indicate the type of processor installed in a system. Such external configuration is less flexible, and more error prone than embodiments of the present invention.

Embodiments of the present invention provide a method and system of processor type determination. Further embodiments meet the previously identified need in a manner that is complimentary and compatible with conventional computer system design techniques. Still further embodiments provide for selecting firmware corresponding to a processor responsive to a processor type determination.

Embodiments of the present invention, processor type determination, are thus described. While the present invention has been described in particular embodiments, it should be appreciated that the present invention should not be construed as limited by such embodiments, but rather construed according to the below claims.

What is claimed is:

1. A method of determining a processor type comprising:
   identifying a reset vector from a processor, wherein said identifying comprises capturing an address of the first data access from said processor after deassertion of a reset signal;
   responsive to characteristics of said reset vector, determining a processor type of said processor.

2. The method of claim 1, wherein one of said characteristics of said reset vector is an address.

3. The method of claim 1 wherein said determining comprises looking up a processor type in a table data structure.

4. The method of claim 3 wherein said looking up comprises utilizing said reset vector as an index into said table data structure.

5. The method of claim 1 further comprising selecting a set of firmware from a plurality of firmware sets corresponding to said processor type.

6. The method of claim 5 wherein said selecting comprises asserting a chip select signal to a memory device comprising said set of firmware.

7. A system comprising:
   a state machine for detecting a reset vector from a processor, wherein said detecting comprises capturing an address of the first data access from said processor after deassertion of a reset signal; and
   a processor type identifier comprising information relating said reset vector to a plurality of processor types.

8. The system of claim 7 wherein said information comprises a table data structure.

9. The system of claim 8 wherein said table data structure resides in the same integrated circuit device as said state machine.

10. The system of claim 8 wherein said table data structure resides in a computer readable media external to said state machine.

11. The system of claim 7 wherein said state machine is implemented in a processor device.

12. The system of claim 7 wherein said information comprises combinatorial logic.

13. The system of claim 7 further comprising a plurality of hardware identification signals for identifying a processor type.

14. The system of claim 7 wherein said state machine is also for providing an output signal indicative of a processor type from said plurality of processor types corresponding to said reset vector.

15. A computer system comprising:
   computer readable media comprising a plurality of firmware sets, said plurality of firmware sets corresponding to a plurality of processor types installable in said computer system, wherein each of said plurality of processor types requires a unique firmware set;
   a processor of said plurality of processor types coupled to said computer readable media for accessing processor instructions;
   a firmware selection device coupled to said processor and to said computer readable media to automatically determine processor type of said processor from said plurality of processor types, wherein said automatically determining said processor tyre of said processor further comprises capturing an address of the first data access from said processor after deassertion of a reset signal; and
   said firmware selection device also to select a firmware set for execution by said processor, wherein said selected firmware set corresponds to said processor type of said processor and wherein said processor type is determined based on a reset vector associated with said processor.

16. The computer system of claim 15 wherein said firmware selection device comprises:
   a state machine for detecting a reset vector from said processor; and
   a processor type identifier comprising information relating said reset vector to a plurality of processor types.

17. The computer system of claim 16 wherein said information comprises a table data structure.

18. The computer system of claim 17 wherein said table data structure resides in the same integrated circuit device as said state machine.

19. The computer system of claim 17 wherein said table data structure resides in said computer readable media.

20. The computer system of claim 16 wherein said firmware selection device selects said firmware set by a correspondence of processor type to said reset vector.

21. The computer system of claim 20 further comprising a plurality of hardware identification signals for identifying a processor type.

* * * * *

UNITED STATES PATENT AND TRADEMARK OFFICE
CERTIFICATE OF CORRECTION

PATENT NO. : 7,246,222 B2 Page 1 of 1
APPLICATION NO. : 10/420287
DATED : July 17, 2007
INVENTOR(S) : Sachin N. Chheda et al.

It is certified that error appears in the above-identified patent and that said Letters Patent is hereby corrected as shown below:

In column 9, line 25, in Claim 2, delete "claim 1," and insert -- claim 1 --, therefor.

In column 9, line 41, in Claim 7, delete "processor,wherein" and insert -- processor, wherein --, therefor.

In column 10, line 24, in Claim 15, delete "tyre" and insert -- type --, therefor.

Signed and Sealed this

Twelfth Day of August, 2008

JON W. DUDAS
*Director of the United States Patent and Trademark Office*